United States Patent
Hlibiciuc et al.

(10) Patent No.: US 8,606,962 B2
(45) Date of Patent: Dec. 10, 2013

(54) METHOD OF OPERATING A SIGNALLING GATEWAY AND AN APPLICATION SERVER, AND SIGNALLING GATEWAY AND APPLICATION SERVER

(75) Inventors: Alexandru Hlibiciuc, Aachen (DE); Robert Schnell, Aachen (DE); Boris Sumic, Zagreb (HR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 12/937,798

(22) PCT Filed: Nov. 17, 2008

(86) PCT No.: PCT/EP2008/009724
§ 371 (c)(1),
(2), (4) Date: Mar. 14, 2011

(87) PCT Pub. No.: WO2009/129837
PCT Pub. Date: Oct. 29, 2009

(65) Prior Publication Data
US 2011/0264807 A1    Oct. 27, 2011

Related U.S. Application Data

(60) Provisional application No. 61/047,035, filed on Apr. 22, 2008.

(51) Int. Cl.
*G06F 13/00* (2006.01)
(52) U.S. Cl.
USPC ........................... 709/238; 709/249; 709/250
(58) Field of Classification Search
USPC ....................................... 709/238, 249, 250
See application file for complete search history.

(56) References Cited

U.S. PATENT DOCUMENTS

| | | |
|---|---|---|
| 6,757,552 B1 * | 6/2004 | Garcia-Martin et al. ...... 455/560 |
| 7,010,114 B2 * | 3/2006 | Stahl et al. ................. 379/221.1 |
| 7,082,121 B1 * | 7/2006 | Stammers et al. ............ 370/352 |
| 7,477,646 B1 * | 1/2009 | Peterson et al. ............. 370/401 |

(Continued)

FOREIGN PATENT DOCUMENTS

| | | |
|---|---|---|
| CN | 1905515 A | 1/2007 |
| JP | 2002084363 A | 3/2002 |

OTHER PUBLICATIONS

Loughney, J. et al. "Signalling Connection Control Part User Adaptation Layer (SUA)." IEFT Network Working Group, Request for Comments: 3868, Category: Standards Track, Oct. 2004.
Morneaul, K. et al. "Signaling System 7 (SS7) Message Transfer Part 3 (MTP3)—User Adaptation Layer (M3UA)." IETF Network Working Group, Request for Comments: 4666, Obsoletes: 3332, Category: Standards Track, Sep. 2006.

*Primary Examiner* — Viet Vu
(74) *Attorney, Agent, or Firm* — Coats & Bennnett, P.L.L.C.

(57) ABSTRACT

A method of operating a signalling gateway in a decoupled mode of operation for routing signalling messages between an SS7 and an IP-based network is provided. Further, the invention relates to a method of processing a connection oriented signalling message at an application server process, wherein the message is exchanged via a signalling gateway between an SS7 network node and the application server process. The application server process serves at least one application server in an IP-based network. The invention further provides a signalling gateway for routing signalling messages between an SS7 network and an IP-based network and an application server comprising an application server process for processing signalling messages, in particular connection oriented messages.

36 Claims, 8 Drawing Sheets

(56) References Cited

U.S. PATENT DOCUMENTS

| | | |
|---|---|---|
| 7,969,969 B2 * | 6/2011 | Rigault et al. ............... 370/353 |
| 8,156,194 B2 * | 4/2012 | Bouckaert et al. ............ 709/217 |
| 2002/0027983 A1 | 3/2002 | Suzuki |
| 2009/0168761 A1 * | 7/2009 | Ohnishi ....................... 370/352 |

* cited by examiner

METHOD OF OPERATING A SIGNALLING GATEWAY AND AN APPLICATION SERVER, AND SIGNALLING GATEWAY AND APPLICATION SERVER

The present invention relates to a method of operating a signalling gateway and of processing signalling messages at an application server, in particular connection oriented signalling messages. The invention further relates to a signalling gateway and an application server.

BACKGROUND OF THE INVENTION

Today's public switched telephone networks use signalling system no. 7 (SS7) telephony signalling protocols mainly to set up and tear down telephone calls, as well as for extended services. The SS7 network comprises signalling end points (SEP), such as services switching points (SSP), e.g. a local exchange. The SS7 network may further comprise signalling transfer points (STP), which are essentially routers which relay SS7 messages between signalling end points. The SS7 network generally uses message transfer part (MTP) 1-3 protocols for the transport of signalling messages. In an STP, routing is for example performed by the MTP-3 layer. A user of the MTP-3 services is for example the signalling connection control part (SCCP) network layer, which provides extended routing capabilities, flow control and segmentation. SCCP also supports a connection oriented mode for the transport of signalling messages, in which an end-to-end connection is established before exchanging data between signalling end points.

For transporting SS7 messages over an Internet protocol (IP) network, the SS7 network and the IP network are connected by a signalling gateway (SG). The signalling gateway adapts the SS7 messages for a transport in the IP network. The adapted messages are then transported in the IP network using user adaptation protocols, for which the signalling gateway implements for example an MTP-3 user adaptation (M3UA) layer or an SCCP user adaptation (SUA) layer. For transport of the user adaptation messages in the IP network, the stream control transmission protocol (SCTP) is generally used. Accordingly, the signalling gateway further implements an SCTP layer and an IP layer. The signalling gateway uses an interworking function to provide an interworking between the MTP3 layer and the M3UA layer or the SCCP layer and the SUA layer. Details on the M3UA and the SUA protocols are given in RFC 4666 and RFC 3868, respectively.

Like SCCP, SUA supports a connection oriented mode for the transfer of signalling messages. In the connection oriented mode, the signalling gateway establishes a connection section towards a remote peer network node. Similarly, the SCCP layer on the signalling gateway establishes a connection section towards the remote SS7 signalling end point. The connection sections are coupled in the signalling gateway, whereby the connection between the signalling end point in the IP and the signalling end point in the SS7 network is established. Once the connection is established, connection oriented data messages can now be easily transferred between the signalling end points via the signalling gateway.

In case that the signalling gateway fails, all the connections coupled at the signalling gateway will be lost. In consequence, corresponding calls for which signalling messages were exchanged via the established connections may also be lost. This may lead to losses in revenue for the operator of the telephony network. Furthermore, the requirements for signalling gateway reliability need to be increased in order to prevent such a loss, which in turn requires more complex signalling gateway architectures and results in higher development costs. Accordingly, there is a need to overcome these drawbacks. In particular, there is need of providing a method which improves the transport of connection oriented messages over a signalling gateway. It is further desirable to provide a signalling gateway and an application server capable of implementing such an improved method of transporting connection oriented signalling messages. It is also desirable to increase the in service performance of a signalling gateway.

SUMMARY OF THE INVENTION

This need is met by the features of the independent claims. The dependent claims describe preferred embodiments of the invention.

According to a first aspect of the invention, a method of operating a signalling gateway in a decoupled mode of operation for routing signalling messages between an SS7 network and an IP-based network is provided. The method comprises, in response to receiving a connection oriented data message from the SS7 network, performing a selection of an application server on the basis of a message transfer part 3 routing label comprised in the message. The message is then forwarded to an application server process (ASP) of the application server in the IP-based network. By routing a signalling message with the signalling gateway in such a way, the signalling gateway does not need to establish connection sections and to couple said connection sections. Accordingly, the connection oriented (CO) data message may be routed via another signalling gateway in case the signalling gateway fails. In consequence, as the connection is not coupled at the signalling gateway, connections and corresponding calls are not lost in case of a signalling gateway failure.

According to an embodiment of the invention, the application server process (ASP) is selected by the signalling gateway (SG) on the basis of a destination local reference (DLR) comprised in a received connection oriented data message and a routing key (RK) comprised in the signalling gateway. As an example, the application server process may be selected by the signalling gateway by extracting a destination reference number label from the destination local reference comprised in the data message received from the SS7 network. The extracted destination reference number label is then compared to a list of destination reference number labels associated with application server processes for the selected application server. The application server process may then be selected for which the associated destination reference number label matches the extracted destination reference number label. As a result, the application server process towards which a received connection oriented data message is routed may simply be selected on the basis of the destination local reference and the routing key. Routing of the connection oriented message without establishing coupled connection sections is thus enabled.

According to another embodiment, the method may further comprise transcribing a connection oriented message into a corresponding message conforming to a user adaptation protocol of the IP-based network in response to receiving a connection oriented data message from the SS7 network. A destination reference number to be included in the transcribed message may then be determined on the basis of a destination local reference comprised in the received message. According to another embodiment, a source reference number to be included in the transcribed message is determined on the basis of a source local reference comprised in a received message. Accordingly, the transcribed connection oriented message may comprise a destination reference number or a source reference number or both. Including these numbers in the transcribed message is advantageous as the application server process receiving the message may use these numbers in order to establish a connection section or associate the message with an existing connection section.

According to another embodiment of the invention, the method further comprises, in response to receiving a connection oriented message conforming to a user adaptation protocol from the IP-based network, transcribing the message into a corresponding message conforming to a signalling connection control part (SCCP) protocol of the SS7 network. Further, a destination local reference (DLR) to be included in the transcribed message may then be determined on the basis of a destination reference number (DRN) comprised in the received message. According to another embodiment, a source local reference (SLR) to be included in the transcribed message may be determined on the basis of a source reference number (SRN) comprised in the received message. As an example, an SCCP user adaptation (SUA) message may be transcribed into an SCCP message, the transcribed message including a DLR or an SLR or both. The mapping of the reference numbers in such a way has the advantage that a destination network node of the SS7 network can identify a connection section towards which the message belongs without the requirement of establishing coupled connection sections at the signalling gateway.

According to yet another embodiment, the method may further comprise, in response to receiving a connection oriented data message from the SS7 network, transcribing the received message into a corresponding message comprising a routing context (RC). The routing context may be determined on the basis of the message transfer part 3 (MTP3) routing label and a routing key comprised in the signalling gateway. The transcribed message is transmitted to the application server process of the application server in the IP-based network. The routing key may for example identify a certain SS7 address range served by an application server, and the application server may thus be selected on the basis of a destination address comprised in the MTP3 routing label and the routing key of the signalling gateway. As a result, the appropriate application server can be selected by using the MTP3 routing label and the routing key, without the need for establishing connection sections at the signalling gateway.

According to another embodiment of the invention, the method further comprises, in response to receiving a connection request message from a network node of one network, transcribing the received message into a corresponding message and routing the transcribed message to a network node in the other network. The connection request message is routed to the network node in the other network by the signalling gateway without establishing a connection section towards one of the networks. As a result, subsequent connection oriented data messages do not have to be routed via the signalling gateway receiving the connection request message, but may be routed via other signalling gateways.

The method may further comprise, in response to receiving a connection oriented data message from the IP-based network, transcribing the received message into a corresponding message comprising a message transfer part 3 routing label determined on the basis of a destination address comprised in the received message, and a network indicator determined on the basis of a routing context comprised in the received message. The transcribed message may then be transmitted to a network node of the SS7 network. As an example only, a received connection oriented SUA message may be transcribed into a corresponding connection oriented SCCP message, e.g. DT1 or DT2, wherein the MTP3 routing label and the network indicator (NI) of the SCCP message may be determined by using address information comprised in the received SUA message. Again, no coupling of connection sections is required at the signalling gateway for connection oriented data message routed from the IP-based network to the SS7 network. The transcribing of the message may further comprise the step of including an originating point code (OPC) in the message transfer part 3 routing label on the basis of an originating point code included in the connection oriented data message received from the IP network. The transcribing may further comprise the step of including a signalling link selection (SLS) in said message transfer part 3 routing label on the basis of a sequence control information element included in the connection oriented data message received from the IP-based network. As an example, an SUA message is received from the IP-based network, the message comprising information on the basis of which the MTP3 routing label is populated. Yet the originating point code (OPC) or the SLS may also be determined on the basis of a local configuration of the signalling gateway.

According to another aspect of the invention, a method of processing a connection oriented signalling message at an application server process is provided, wherein the message is exchanged via a signalling gateway between an SS7 network node and the application server process serving at least one application server in an IP-based network. The method comprises, in response to receiving a connection request message via a signalling gateway, establishing a connection section comprising at least a network address of an SS7 network node received with said connection request message, and assigning a destination reference number to said connection section. The method further comprises, in response to receiving a connection oriented data message via the same or a different signalling gateway, associating the received connection oriented data message with a connection section established by the application server process having a destination reference number corresponding to a destination reference number included in the received connection oriented data message. By processing connection oriented signalling message in such a way, there is no need to establish a connection section at a signalling gateway, and an end-to-end connection may be established between the application server process and a remote SS7 signalling end point. By making use of the destination reference number, the application server process is capable of determining the connection section towards which a received connection oriented data message belongs, irrespective of the signalling gateway via which the connection oriented data message is received. Accordingly, the application server process is enabled to receive connection oriented (CO) data messages for a connection section via another signalling gateway in case that the signalling gateway via which the corresponding connection request message was received fails.

According to an embodiment of the invention, the method further comprises, in response to receiving the connection request message, storing in the connection section at least one address related element comprised in the received message. The address related element may for example be a sub system number (SSN), a destination point code (DPC), an originating point code (OPC), a signalling link selection (SLS), a calling party address (CgPA), called party address (CdPA), a routing context (RC), or a source reference number (SRN). The connection section may store one or more of said address related elements.

According to another embodiment, the method may further comprise the re-assembling of connection oriented data messages received from the SS7 network associated with the same connection section into a user adaptation protocol data message, said connection oriented data messages being received via the same or via different signalling gateways. As the messages may be received via different gateways, re-assembling of a message may not be possible at a signalling gateway and accordingly, it is advantageous to re-assemble such a message at the application server.

According to another embodiment, the method further comprises generating an outgoing connection oriented data message comprising at least a destination point code (DPC) for addressing a network node in the SS7 network. The destination point code is determined from a destination point code stored in a connection section associated with the generated connection oriented data message and established in the application server process. The method further comprises sending the connection oriented data message to a signalling gateway towards which the application server process has an active association. Including the destination point code has the advantage, that a signalling gateway receiving the message is enabled to determine an SS7 network node towards which the message is to be routed, even if the signalling gateway has no connection section established towards the application server process or towards the SS7 network node. The generating of the connection oriented data message may further comprise including a routing context in the message, the routing context being determined from a routing context stored in the associated connection section. Alternatively, the routing context may be determined by the application server process on the basis of a routing key. The method of the embodiment may further comprise the sending of plural outgoing connection oriented data messages towards the SS7 network, said messages being associated with the same connection section. The outgoing connection oriented data messages may be distributed between at least two signalling gateways towards which the application server process has active associations. This has the advantage that in case a signalling gateway via which the application server process received a connection request message or sent a connection acknowledge message fails, the application server process may still send connection oriented data messages for the same connection section via another signalling gateway.

Further, a load sharing process may be used for distributing outgoing connection oriented data messages which may be associated with different connection sections between at least two signalling gateways. By using load sharing, a congestion at a signalling gateway may be avoided. Further, the load sharing process may take sequence control values associated with the outgoing connection oriented data messages into account. As an example, load sharing may be achieved by using a round robin method.

According to the present embodiment, the generating of the connection oriented data message may further comprise including an originating point code in said message. The originating point code may be determined from an originating point code stored in the associate connection section. Such an OPC may be used by a signalling gateway receiving the generated connection oriented data message to populate an MTP3 routing label. The method of the present embodiment may further comprise the step of segmenting the outgoing connection oriented data message and sending resulting segmented messages towards the same or different signalling gateways. These messages may then be later re-assembled at an SS7 signalling end point. As the messages may be send via different signalling gateways, load sharing becomes possible.

According to another embodiment, the signalling gateway and the application server each implement a protocol stack comprising a signalling connection control part (SCCP) user adaptation (SUA) protocol layer. Further, the connection oriented messages sent or received from the IP-based network may conform to the signalling connection control part (SCCP) user adaptation (SUA) protocol. As an example, connection request (CORE), connection acknowledge (COAK), or connection oriented data transfer (CODT) SUA messages may be exchanged between a signalling gateway and an application server process. Preferably, messages exchanged between the signalling gateway and an SS7 signalling endpoint conform to the SCCP protocol. Such SCCP messages may for example comprise a connection request (CR), a connection confirm (CC), or a data form 1 (DT1), or data form 2 (DT2) message. Messages according to the SCCP protocol or the SUA protocol are known to a person skilled in the art and will not be further elaborated here.

According to another aspect of the invention, a signalling gateway for routing signalling messages between an SS7 network and an IP-based network is provided. The signalling gateway comprises a routing unit configured to route a connection oriented data message from the SS7 network to an application server process in the IP-based network by performing a selection of an application server on the basis of an MTP3 routing label comprised in the message and forwarding the message to an application server process of the application server. As the signalling gateway is capable of routing a received message on the basis of the MTP3 routing label, it does not need to establish connection sections towards the SS7 signalling endpoint or the IP-based application server process, enabling a re-routing of connection oriented data messages via another signalling gateway in case of failure.

The signalling gateway may further comprise a list of destination reference number labels for an application server. Each destination reference number label may be associated with an application server process of the application server. The list may be used for selecting an application server process on the basis of a destination local reference comprised in a received data message as described above. This enables a selection of the correct application server process towards which a received connection oriented data message is to be routed.

According to an embodiment, the signalling gateway further comprises a transcription unit configured to transcribe a connection oriented data message received from the IP-based network into a corresponding SS7 message, which may comprise an MTP3 routing label determined on the basis of a destination address comprised in the received message and a network indicator determined on the basis of a routing context comprised in the received message, and a destination local reference determined on the basis of a destination reference number comprised in the received message. The routing unit is configured to route the transcribed message to a network node of the SS7 network. A transcription unit may for example transcribe a received SCCP connection oriented data message into an SUA connection oriented data message, with address parameters of the SUA message being determined on the basis of address parameters of the SCCP message, without the need for coupled connection sections established at the signalling gateway. Accordingly, the routing unit may be configured to route a connection request message from a network node of one of the SS7 or IP-based networks to a network node in the other network without establishing a connection section towards one of the networks. Not establishing the connection sections has the advantage that the signalling gateway requires fewer resources and that subsequent connection oriented data messages do not need to be routed via the same signalling gateway, but may be routed via other signalling gateways. The routing unit may thus be configured to route a connection oriented data message without previously receiving an associated connection request message. As an example, the routing is accomplished by using address information comprised in the received connection oriented data message and information stored locally on the signalling gateway, e.g. a routing key comprising a list of DRN-labels.

According to another aspect of the invention, an application server comprising at least one application server process for processing a signalling message is provided. The application server process is configured to establish a connection section in response to receiving a connection request message from an SS7 network node via a signalling gateway and to receive connection oriented data messages for the same connection section via at least two different signalling gateways. As the connection request message and subsequent associated connection oriented data messages do not need to be received via the same signalling gateway, the application server process can still process traffic for the connection section in case where the signalling gateway via which the connection request message was received fails.

In an embodiment of the invention, the application server process is configured to associate a connection oriented data message received via any signalling gateway with the connection section on the basis of a destination reference number assigned to said connection section and a destination reference number comprised in the received message.

According to another embodiment, the application server process is configured to establish a connection section towards a remote SS7 network node. The application server process may then route connection oriented data messages associated with the same connection section towards said SS7 network node via different signalling gateways. The application server process may for example employ a load sharing method, yet it may also route the messages over the same signalling gateway. With such a configuration, re-routing of messages for a connection section established at the application server process in case a signalling gateway fails is enabled.

The application server process may be furthermore configured to store availability states of SS7 network nodes accessible via a signalling gateway towards which the application server process has a network association. Accordingly, the application server process is enabled to select a signalling gateway via which a connection oriented message is to be routed for reaching a particular SS7 network node. If a signalling gateway loses connectivity towards a destination SS7 network node, the application server process may re-route connection oriented messages for said destination network node via another signalling gateway.

According to a further aspect of the invention, an electronically readably data carrier with stored electronically readable control information is provided. The control information is configured such that when using the data carrier in a computer system, the control information performs one of the above-described methods. The control information may also be implemented in a computer program product.

Those skilled in the art will appreciate that one or more features of the above-described aspects and embodiments of the invention may be combined. As an example, one of the above-described methods may be implemented in a signalling gateway or an application server, or embodiments of above-described methods may comprise steps described with respect to the signalling gateway or the application server.

The foregoing and other features and advantages of the invention will become further apparent from the following detailed description read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Embodiments of the present invention are illustrated by the accompanying figures, wherein.

DETAILED DESCRIPTION

Figure 1:
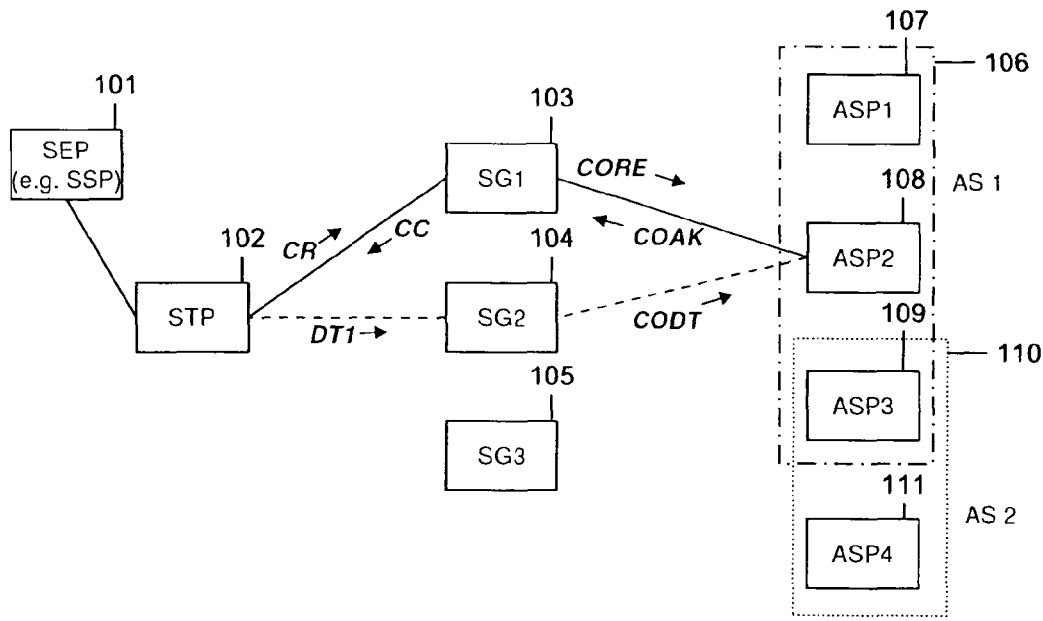
FIG. 1 shows a schematic block diagram of a network architecture using signalling gateways according to an embodiment of the invention to interconnect an IP-based network and an SS7 signalling network.
Figure 2:
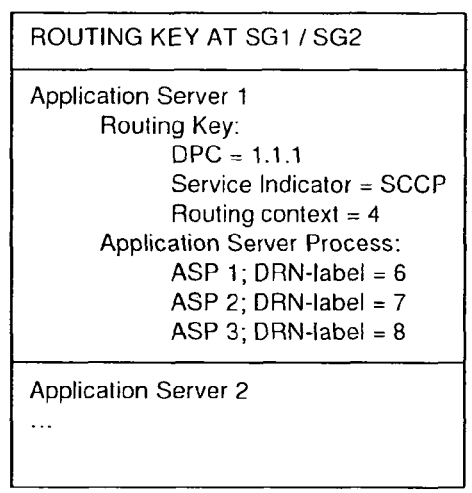
FIG. 2 is a schematic representation of a routing key at a signalling gateway.

FIG. 1 schematically illustrates the routing of connection oriented messages via multiple signalling gateways. Signalling endpoint (SEP) 101 and signalling transfer point (STP) 102 are located within the SS7 signalling network. SEP 101 may implement a protocol stack comprising MTP1 to 3 protocol layers, an SCCP protocol layer and further application layers using the services of SCCP. STP 102 functions as a simple relay node and may implement a protocol stack comprising MTP layers 1 to 3 for performing MTP3 routing of signalling messages. Signalling gateways (SG) 103, 104 and 105 are located on the boundary between the SS7 signalling network and the IP-based network. It should be clear that SEP 101 may connect to a signalling gateway directly or via more than one STP 102. In the example of FIG. 1, the signalling gateways 103 to 105 implement an SS7 protocol stack comprising MTP layers 1 to 3 and an SCCP layer, as well as an IP protocol stack comprising an IP layer, an SCTP layer, and an SUA layer. An interworking function between the SCCP layer and the SUA layer may perform a translation or transcription of messages between the layers comprising a mapping of address parameters. Accordingly, the signalling gateways may communicate with the SCCP layer on SEP 101 by sending SCCP messages. On the IP side, the signalling gateways comprise SCTP association towards application server processes. Application server 106 comprises application server processes 107, 108 and 109. Application server 110 comprises application server processes 109 and 111. Application server process (ASP) 109 serves both application server (AS) 110 and AS 106. The signalling gateways 103 to 105 comprise routing keys which define the range of traffic processed by a particular application server. Such a routing key is schematically shown in FIG. 2. The application server processes implement a protocol stack comprising an IP, an SCTP and an SUA protocol layer, and further application layers. Accordingly, messages conforming to the SUA protocol may be exchanged between the signalling gateways and the application server processes. It should be clear to a person skilled in the art that each signalling gateway may implement several signalling gateway processes (SGPs), using which the signalling gateway communicates with the SEP 101 or the application server processes.

In conventional systems, upon the SEP 101 sending a connection request (CR) message to one of the signalling gateways, the signalling gateway establishes a connection section towards the SEP and towards an ASP, couples these connection sections and routes a corresponding connection request (CORE) message to the ASP. As the signalling gateway now holds the connection sections, further connection oriented messages belonging to this connection have to be transported via the same signalling gateway. In case the signalling gateway fails, the connection is lost, and corresponding calls may also be lost. As the connection sections are coupled on the particular signalling gateway, re-routing via another signalling gateway is not possible.

According to the present embodiment of the invention, signalling gateway 103 does not establish connection sections upon receiving a connection request message CR. Signalling gateway 103 transcribes the CR message into an SUA CORE message and transmits it to ASP 108. ASP 108 now sends a connection acknowledge message COAK towards SEP 101 either via the same or via another signalling gateway. In the present example, the COAK message is sent to SG 103, which converts it into a corresponding connection confirm message CC, which is routed to SEP 101 via STP 102.

SEP 101 established a connection section and accordingly, an end-to-end connection between the SUA ASP 108 and the SCCP SEP 101 exists, without any coupling of connection sections at the signalling gateway. Accordingly, a decoupled operation of signalling gateways for connection oriented messages is enabled.

A data form 1 message DT1 may now be routed to ASP 108 via signalling gateway 104. As signalling gateway 104 comprises no connection sections for the message DT1, it is required to determine the correct ASP towards which the message is to be routed based on address information comprised in the DT1 message and on information stored locally in the signalling gateway such as the routing key shown in FIG. 2. SG 104 determines the correct application server process and transcribes message DT1 into corresponding connection oriented data transfer message CODT, which is then transmitted to ASP 108. ASP 108 associates the received CODT message with a particular connection section and may then transfer data comprised in the message to the appropriate application.

In case signalling gateway 103 fails, data messages can be routed via SG 104 or 105. In the described decoupled mode of operation, such a re-routing is easily performed, as no connection sections were established at any signalling gateway. Similarly, ASP 108 may route connection oriented data messages towards SEP 101 via different signalling gateways, e.g. using load sharing considerations. The ASP 108 may use such a decoupled mode of operation if at least two routes via different signalling gateways are available to a SS7 destination signalling endpoint. As data messages sent towards ASP 108 may now be routed by different signalling gateways, the messages may be re-assembled at the ASP.

Signalling end point 101 generally addresses the destination network node with a signalling point code (SPC), which is included as a destination point code (DPC) in a message sent by the SEP. Signalling gateways 103 to 105 comprise an own signalling point code, and the MTP3 layer in the signalling gateways generally only delivers messages to the SCCP layer if they are addressed to this signalling point code. Yet for routing connection oriented messages originated in the SS7 network via different signalling gateways, the messages should not be addressed towards a particular signalling gateway. Accordingly, a hosted point code concept may be implemented in the signalling gateways, so that messages not addressed to a particular signalling gateway can still be processed by the SCCP layer of the signalling gateway. The concept of the hosted point code is in detailed described in the U.S. provisional application No. 61/047,035, of which the present disclosure claims priority. The disclosure of the provisional U.S. patent application No. 61/047,035, including the specification, the drawings and the abstract is incorporated herein by reference in its entirety. In the hosted point code concept, the SS7 messages are addressed to a signalling point code assigned to an application server, wherein the signalling gateways are configured to process messages received for this point code on the SCCP layer level. This basically means that the signalling point code assigned to the application server is hosted at the signalling gateway. An SS7 message addressed to the application server is processed at the MTP3 layer of the signalling layer by comparing the destination address to the hosted signalling point code. If the destination point code of the message matches the hosted signalling point code, the message is delivered to the upper SCCP layer, which further processes the message. As the signalling point code of the application server may be hosted at several different signalling gateways, messages destined towards the application server may be routed via different signalling gateways. It is particularly advantageous to use the decoupled mode of operation of the signalling gateways in combination with such a multiple signalling gateway scenario. Yet is should be clear that implementations other than the hosted point code concept may be used to achieve routing of signalling messages via different signalling gateways implementing an interworking between SCCP and SUA layers.

Signalling gateways 103 to 105 may further support a coupled operation, e.g. according to an SUA standard, in parallel to the decoupled operation of the multiple signalling gateway scenario. The selection of the operation type can be performed based on capabilities provided by remote nodes or based on attributes provisioned per signalling relation in signalling gateways and application server processes.

Figure 3:
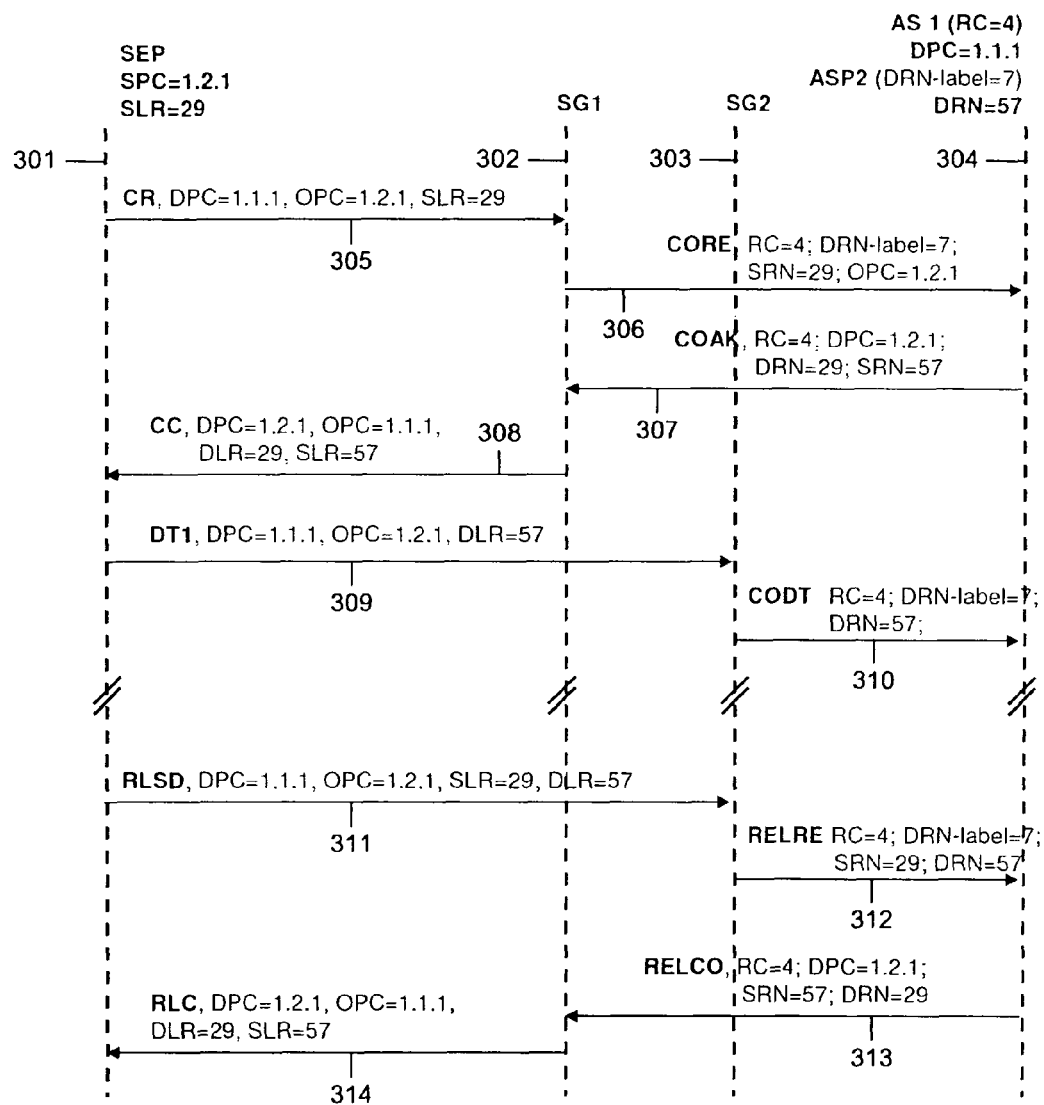
FIG. 3 is a flowchart illustrating the sending of connection oriented messages according to an embodiment of the present invention.

The flow diagram of FIG. 3 illustrates an embodiment of a method according to the invention. SCCP/SUA messages are routed via signalling gateways between the SS7 and the SUA signalling networks.

In the embodiment, the SGs work in a decoupled mode of operation, where they do not keep connection sections, and act as STPs, that is, SGs are supposed to route traffic to the SUA network based on an MTP3 routing label. The receiving ASP is aware of the connection, and associates incoming messages with connection sections based on DRNs and routing contexts (RCs). There is nothing in the SS7 network requiring CO messages in one direction and CO messages in the other direction to pass through the same STP/SG.

An MTP3 routing label may for example include a destination point code (DPC), an originating point code (OPC), and a signalling link selection (SLS). Some implementations may also consider a network indicator (NI) as being part of a MTP routing label, for example the AXE function "CCS Nr. 7, MTP point code mapping".

There are two directions of CO traffic flow that have to be considered: SCCP SEP to SGP to ASP, and ASP to SGP to SCCP SEP.

An agreement on treatment of destination and source address information element IE in CO messages may be needed to stay aligned with SCCP and provide for decoupled operation of SGs. Following SCCP approach, source and destination addresses in connection request (CORE), connection acknowledge (COAK), and connection refused (COREF) messages may refer to direction of a connection and may contain source and destination addresses of connection sections. Source and destination addresses in connection oriented data transfer (CODT), release request (RELRE), release complete (RELCO), connection oriented error (COERR), and inactivity test (COIT) messages indicate the source and destination of the message. The SG acting in decoupled mode shall follow that rule and route messages accordingly based on source or destination addresses, or both in case the RK contains both OPC and DPC. The above SUA messages are well-known to a person skilled in the art and are in detailed explained in RFC 3868.

In the decoupled mode of operation, only three octets out of four octets available in the SUA destination reference number information element may be used, as the destination reference number in SCCP only comprises three octets. Accordingly, the remaining bits of a SUA destination reference number (DRN) and a source reference number (SRN) may be coded 0 in SUA connection oriented messages.

Decoupled operation of SGs means that ASPs do not need to know/remember what signalling gateway process (SGP) of the SG holds the connection. Therefore, the ASP can load share outgoing/backward traffic between SGP based on sequence control values. Moreover, there will be no traffic disturbances if ASPs re-route CO traffic from one SG to another SG, if SGs have available routes to SS7 destinations.

The RC may be present in the SUA CO messages and help in identifying the AS and SCCP protocol variant and market versions, for instance to understand whether it is ANSI, or ETSI SCCP that shall process the message (both in ASP and SG).

Since SGs do not keep states of connections in decoupled operation, full SCCP state machines may be implemented at the ASP. One could try to avoid or simplify state machines in ASPs in case of coupled operation, if there is no legacy, i.e. SS7, implementation which has already support for those procedures.

In the present embodiment, SGs do not perform any connection related procedures such as inactivity test. Instead, SGs simply forward received CO messages to their destinations. Connections are end-to-end between an ASP and a SEP residing in the SS7 network. SGs mainly perform a mapping and forwarding as described below.

An incoming SCCP connection request (CR) message contains information, such as the global title (GT) or a subsystem number (SSN), based on which the SG selects an application server/application server process. This information may no longer be present in subsequent SCCP connection oriented messages, such as connection oriented data messages. Conventional systems thus required a coupling of connection sections at the conventional SUA signalling gateway.

Figure 4A:
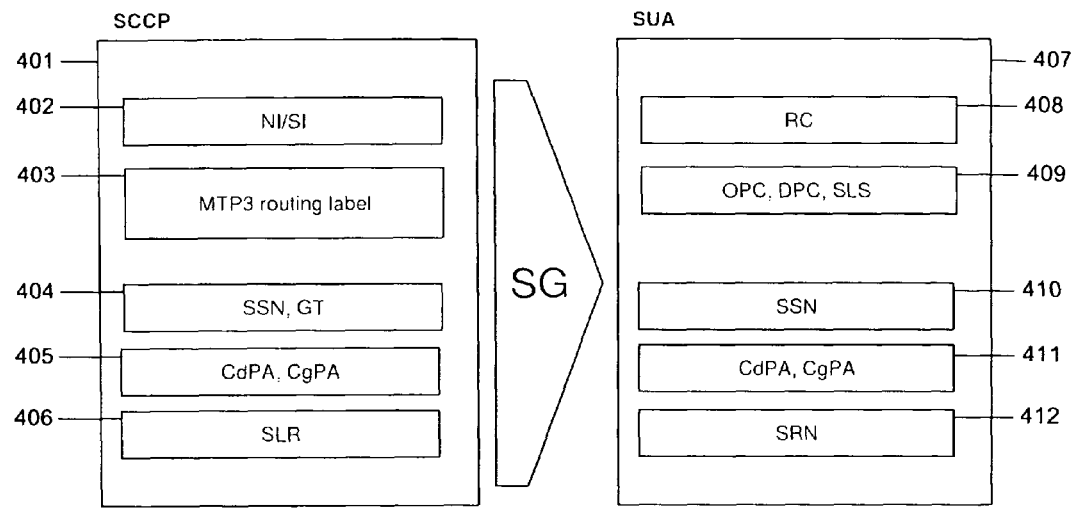
FIGS. 4A and B are schematic representations of address related parameters comprised in messages sent from an SS7 signalling endpoint to a signalling gateway and from the signalling gateway to an application server process.

With respect to FIG. 3, signalling endpoint 301 sends a CR message to signalling gateway 302, the CR message being addressed to DPC=1.1.1, which is the destination point code of application server 304 (AS1). The CR message further comprises a source local reference (SLR) identifying a connection section at SEP 301. In response to receiving the CR message, signalling gateway 302 does not establish a connection section, but transcribes the message into a corresponding CORE message conforming to the SUA protocol. SG 302 maps the SLR into a source reference number (SRN) comprised in the CORE message. SG 302 may also perform a global title translation for the message to identify the application server/application serve process, or may perform a selection of an appropriate application server process, e.g. by making use of a routing key such as shown in FIG. 2. The routing key identifying the traffic range for the application server may for example comprise a list of active ASPs, out of which an ASP may be chosen by the SG towards which the CORE message is routed. The CORE message should comprise the OPC of the MTP3 routing label, so that the ASP can identify the SEP originating the message. An example of mapping of address related parameters performed by signalling gateway 302 is shown in FIG. 4a.

A connection request message received by the SG from the SEP may for example comprise a network indicator (NI) and/or a service indicator (SI), an MTP3 routing label including a DPC, an OPC and an SLS, a subsystem number (SSN) and global title (GT) 404, a CdPA and a CgPA 405, and an SLR 406. These address related parameters may be mapped to corresponding parameters in the SUA CORE message 407. The CORE message 407 comprises for example a routing context 408, address parameters 409 of the MTP3 routing label, such as an OPC, a DPC, and an SLS, a subsystem number 410, a CdPA and CgPA 411 and an SRN 412. The SG maps the SLR 406 to the SRN 412, so that in a return message sent by the ASP, the SEP can identify the connection section towards which the return message belongs.

Figure 6:
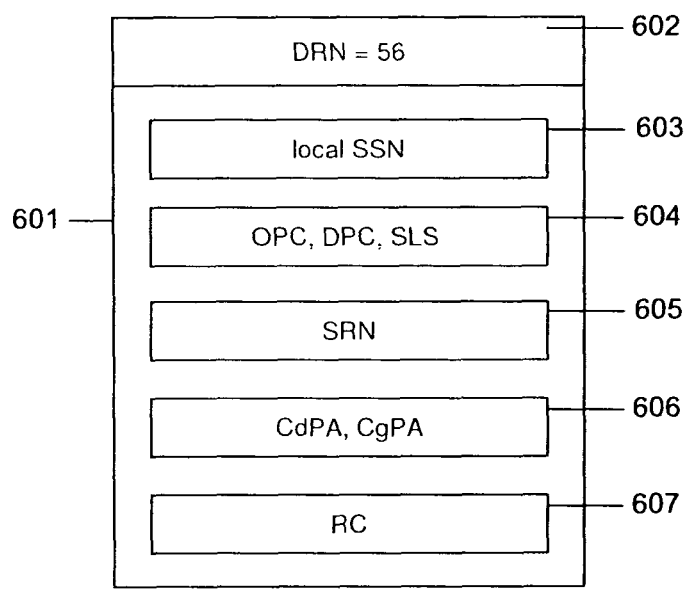
FIG. 6 is a schematic representation of address related information stored in a connection section at an application server process according to an embodiment of the invention.

In response to receiving the CORE message, the ASP (SUA layer) creates a data record that represents a connection section. A destination reference number is assigned to the connection section. A data record stored for the connection section created in response to receiving CORE message 306 is shown as an example in FIG. 6. The data record 601 comprises the DRN 602 and parameters received with the CORE message such as the subsystem number 603, OPC, DPC, SLS 604, SRN 605, CdPA, CgPA 606 and RC 607. A subsequent CO message received at the ASP, which may not comprise any of the parameters 603 to 607 may then be associated with the connection section based on the destination reference number 602, and accordingly, with e.g. a particular local subsystem number. Even though the message may not contain an SSN, it may thus still be delivered to the appropriate application.

All ASes in a local ASP/IPSP may use the same DRN label. Then, an ASP can associate incoming messages (other than CORE) with an existing connection section, and a served AS using the received DRN value only (when ANSI and non-ANSI variants are used simultaneously, the same DRN value can represent different connections). The RC may be sufficient to select the right standard and network context, and corresponding software complex. The consequence of this option is that different ASes cannot use the same local reference number (LRN) for different connection sections within an ASP (with ANSI, non-ANSI exception), which restricts the DRN space within an ASP.

A scheme may be used where ASPs identify a connection section an incoming message belongs to based on a pair of RC and DRN received in the message. SGs on their turn select first an AS and then an ASP according to the DRN which matches the ASP DRN label for that particular AS.

The number of RCs is totally unrelated to the label restrictions. DRN labels do not define an RC, it is specified within a RC to build up a static distribution table in the SGs for this particular RC. And it is automatically rebuilt each time an SG or an association goes down. One can define another (or the same) set of labels for any given RC. Furthermore, the approach is independent of whether connections exist or not, or how many, it just tells the SG how to select an ASP if required. Labels are related to the layout the ASPs within a RK/RC want to give to their TID or DRN number space. It does not pose any limitations whatsoever on the amount of RCs, global title translation and address mapping function.

Figure 4B:
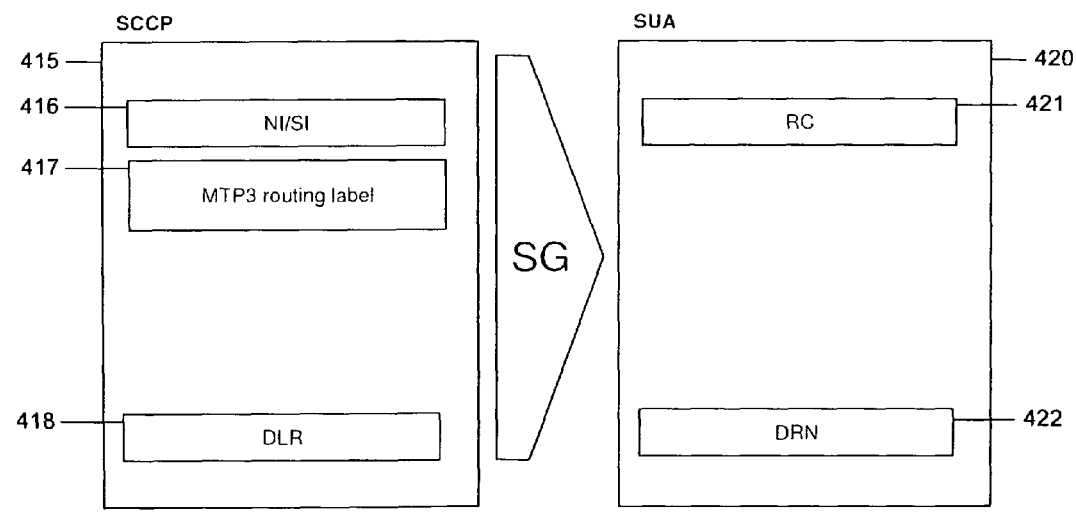
Figure 5A:
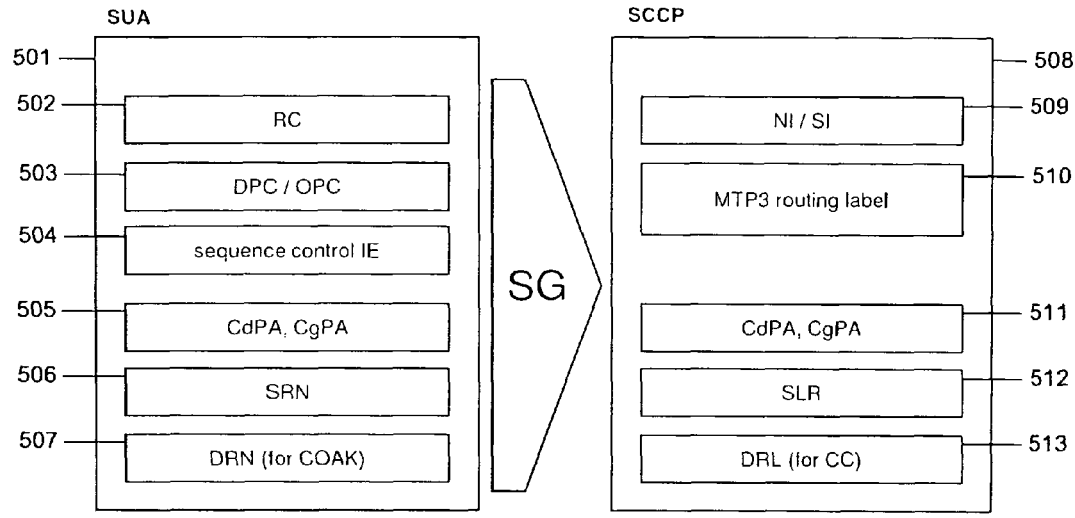
FIGS. 5A and B are schematic representations of address related information comprised in connection oriented messages sent from an application server process to a signalling gateway and from the signalling gateway to an SS7 signalling endpoint.

After establishing the connection section, ASP 304 sends a COAK message 307 to SG1. It should be clear that the COAK message may also be routed via SG2, e.g. in case SG1 becomes unavailable. The COAK message comprises a destination point code corresponding to the originating point code received with the CORE message and stored in the connection section. The message further comprises the DRN assigned by the ASP as a source reference number (SRN). It further comprises the SRN received with the CORE message and stored in the connection section as a destination reference number (DRN). SG1 302 receives the COAK message, transcribes it into a corresponding CC message and routes it towards SEP 301. When transcribing the message, SG1 maps the DRN and the SRN to a corresponding DLR and SRL, respectively. The mapping of address related parameters by the signaling gateway 302 is illustrated in FIG. 5a. The mapping shown in FIG. 5a, as in FIG. 4a, may for example be applied for CORE, COAK and COREF messages, and the corresponding SCCP messages. COAK message 501 comprises routing context 502, based on which the SG determines an NI and SI 509 to be included in CC message 508. The message 501 further comprises DPC and OPC 503, which are used by the SG to populate the MPT3 routing label 510 of message 508. Further parameters that may be comprised in message 501 include the CdPA and CgPA 505, sequence control information element 504, an SRN 506 and a DRN 507. These are mapped to corresponding parameters in message 508. Whereas in case of a COAK message, message 501 comprises a DRN 507 referencing the connection section at SEP 301, such a DRN may not be comprised in a CORE message originated by the ASP, as the SEP has not yet established a connection section in that case and assigned a corresponding reference number, the DRN is thus unknown to the ASP:

Again referring to FIG. 3, SEP 301 can associate the received CC message 308 with the appropriate connection section on the basis of the DLR comprised in the message. SEP 301 now initiates the sending of data message DT1 309. As SG1 302 did not store and couple connection sections, the message 309 can be routed via SG1 302 or SG2 303. Connection oriented data messages generally comprise fewer address information. This situation is shown in FIG. 4b, where the SCCP data message 415 originated by SEP 301 only comprises an NI/SI 416, an MTP3 routing label 417 and a DLR 418. The SG 303 receiving message 309 uses the MTP3 routing label and possibly a local configuration of the SCCP protocol version and market variant for selecting an application server towards which the message is destined. With reference to FIG. 2, signaling gateway 303 may use the DPC comprised in message 309 to select an appropriate routing key. The routing key comprises a list of application server processes serving the application server, which are identified with individual DRN labels. The message 309 comprises the DLR, which corresponds to the DRN 602 assigned to the connection section by the application server process. As the DRN 602 comprises the DRN label, the signaling gateway 303 is capable of extracting the DRN label from the DLR received with message 309. Accordingly, a signaling gateway is capable of choosing the appropriate ASP from the list of ASPs in the routing key. SG2 303 transcribes the message into a corresponding CODT message, maps the DLR to a corresponding DRN and includes the routing context which identifies the routing key. The CODT message 310 is then transmitted to the appropriate application server process, here ASP2 304. The mapping of the address parameters is schematically shown in FIG. 4b.

As the CODT message comprises the DRN, ASP2 304 can associate the CODT message with the appropriate connection section 601, and identify the local subsystem towards which the message is to be delivered.

SEP 301 may send further data messages to ASP2 304, which may be routed via different signaling gateways. As message size is limited in SS7 networks, a reassembling of these messages may be performed at a signaling gateway. Yet in the present embodiment, the ASP is configured to perform a reassembling of incoming messages as the messages may be received via different signaling gateways. Accordingly, the SGs are configured to transfer connection oriented traffic to ASPs without reassembling it. For example, due to failures in the network, it may not be possible for an SG to reassemble DT1 or DT2 messages into a large CODT message. In the multiple SG case, failures in the network can cause some segments to go to the other SG making a reassembling of the message impossible. The first signaling gateway may for example deliver the first segments to the ASP and the second signaling gateway cannot tell where the beginning of the segment is. Also, the reassembling process at the signaling gateway can unreasonably increase data transfer latencies.

Using the routing label to select the application server has implications on the possible routing key granularity in the SGs and connected ASPs. In the decoupled mode, the routing key granularity may for example be limited to ranges/sets of MPT3 routing labels. In particular, since SSN may not be included in SCCP messages other than CR messages, the SG and connected ASPs may not support a routing key granularity of SSN in the decoupled mode. Otherwise, SGs may not be able to select destination application servers, or may not be able to populate RC values in messages sent to ASPs. Although an SSN level of RK granularity may not be used for CO traffic, it still may be implemented for CR traffic. A limitation may be introduced that connection less (CL) traffic routed to the same DPC as CO traffic cannot use routing keys with an SSN granularity. When CO and CL traffic are separated and use different DPCs (and/or OPCs), CL traffic can make use of an SSN level of RK granularity. SGs may derive the RC from net up/OPC/DPC/CO traffic parameters only, and do not rely on SSN or anything else because there may no other usable SS7 traffic parameters present in a DT1 message. In a coupled approach, an RC definition can use the parameter from a CR message (SSN, GT, . . . ).

Figure 5B:
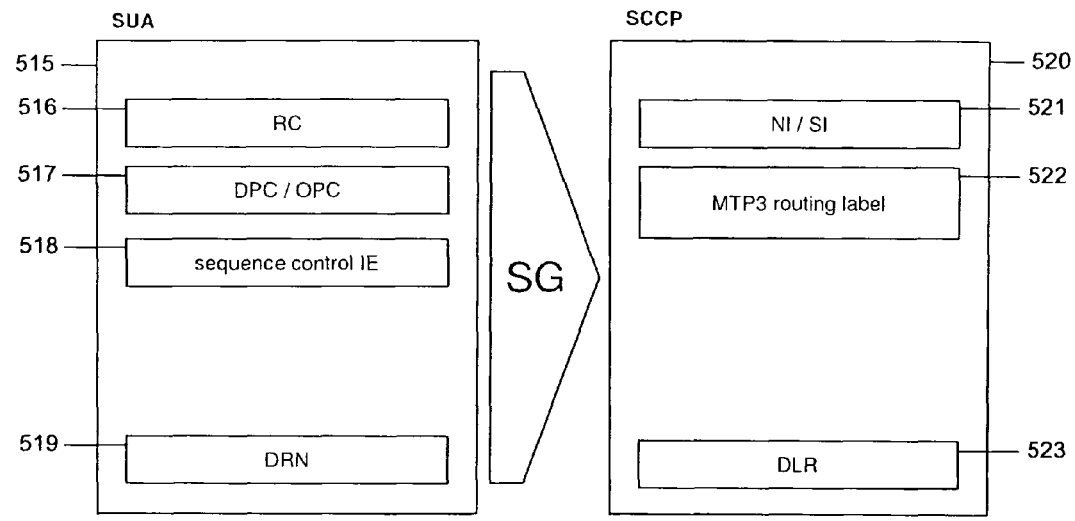

After establishing connection sections, e.g. by sending a CORE message to an SEP or by receiving an CORE message from an SEP, the ASP may send data messages towards the SEP via different signaling gateways. When creating the data message, the ASP may include address parameters in the connection oriented data message which are stored in the connection section associated with the data message. Referring to FIG. 5b, the ASP may include an RC 516 in the data message 515, which may be determined on the basis of a local routing key or from the associated connection section. The message may further comprise DPC and OPC 517, a sequence control information element 518, and DRN 519. It is preferable to include the DPC and the DRN, as the DPC is used by the SG to route the message to the appropriate SS7 destination, which uses the DRN to identify the connection. The SG transcribes the message into a corresponding data message 520, which comprises an NI/SI 521 determined on the basis of RC 516, an MTP3 routing label 522, which may be populated on the basis of DPC/OPC 517 or a local configuration of the SG, and DLR 523 mapped from DRN 519.

An SUA connection oriented data message according to SUA standard RFC 3868 may not have enough information for an SG to determine where the message is to be routed. Accordingly, the DPC 517 is included in message 515. Only including a DRN may not be sufficient, as the SG has not established connection sections. The DPC and AC, which is used to derive the NI value in the SG, are generally sufficient for the SG to determine the SS7 destination of the SUA message.

It should be clear that not all the address parameters shown in FIGS. 4a, b and 5a, b are required in the messages exchanged between the SEP, the SG and the ASP. Most of the address elements are optional, data message 515 does for example not need to comprise an OPC. For example in a CORE message sent from an ASP, the source address information element is optional according to RFC 3868. Accordingly, the SG should be able to populate the OPC in the MTP3 routing label of the corresponding SCCP message based on a local configuration.

According to the present embodiment, a destination address information element should be used in CODT, RELRE, RELCO, COERR and COIT messages. The destination address IE should at least contain the DPC of the MTP3 routing label, although it is against the RFC 3868 standard. Further in decoupled operation, a sequence control information element may also be present in CO messages, and may be used for determining a signaling link selection (SLS) at the SG which will be used to populate the MTP3 routing label. An outgoing CODT message transmitted by the ASP may also include the MTP routing label as recorded in the connection section data. Including an RC value in the connection section data may save capacity and avoid unnecessary checks for CODT messages. The OPC in an outgoing message is an optional parameter as the connection section record kept in the peer node (SEP) may keep the connection origin (or destination).

Further, when routing messages towards the SS7 network, the signaling gateways may perform a segmentation of outgoing connection oriented traffic according to the SCCP standard, wherein DT1 messages have fixed links. Yet it is preferred that segmentation of CO messages is performed at the SUA ASP.

Again referring to FIG. 3, the tear down of an established connection is illustrated. A released (RLSD) message 311 is sent from SEP 301 to SG2 303, where it is transcribed into a corresponding release request (RELRE) message 312, again comprising a mapping of the SLR and DLR comprised in message 311 to an SRN and DRN comprised in message 312, respectively. In response to receiving message 312, ASP2 304 send release confirm (RELCO) message 313 via SG2 302 to SEP 301. The message is transcribed by SG1 into a corresponding release complete (RLC) message 314. After exchanging these messages, the connection is terminated.

Figure 7:
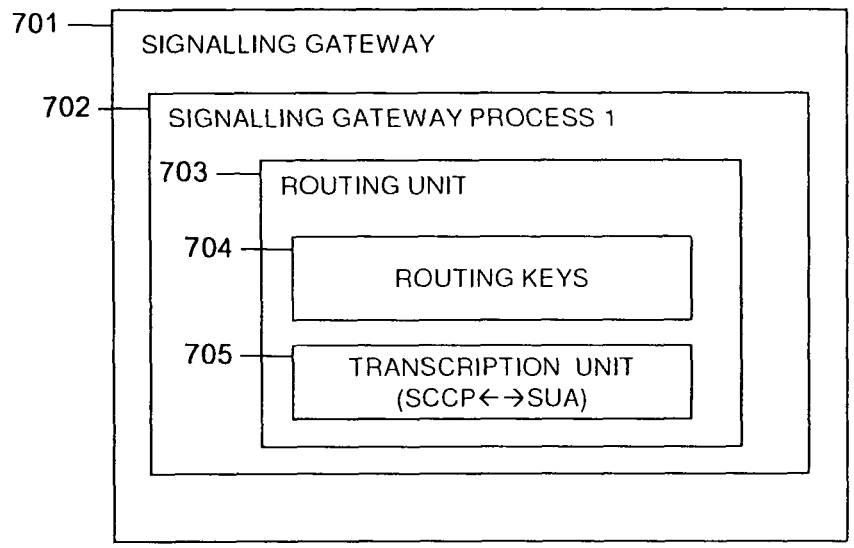
FIG. 7 is a schematic block diagram illustrating a signalling gateway according to an embodiment of the invention.

FIG. 7 shows schematically a signaling gateway 701 according to an embodiment of the present invention comprising a signaling gateway process 1 702. It should be clear that SG 701 may comprise further signaling gateway processes (SGPs). SGP1 702 implements routing unit 703, which comprises a transcription unit 705. Routing unit 703 is configured to route messages between the SS7 network and the IP-based SUA network. Transcription unit 705 performs a transcription or translation of messages between SCCP and SUA, and a mapping of address parameters, as described above. Routing key 704 comprises a list of destination reference number labels which identify application server processes serving a particular application server. When receiving a message from the SS7 network, the routing unit 703 performs a selection of the application server and application server process using routing key 704 and address parameters comprised in the message. Signaling gateway 701 is capable of operating in a decoupled mode of operation, where connection request messages are routed without establishing connection sections. Further, the signaling gateway is configured to route connection oriented data messages without having established a connection section associated with said message.

It should be clear that signaling gateway 701 may comprise further elements, such as various interfaces towards SUA or SS7 network nodes. The signaling gateway may be implemented on a host computer comprising a micro processor, memory, network interfaces and other elements common to a computer. The signaling gateway process may for example be implemented as software running on the host computer.

Figure 8:
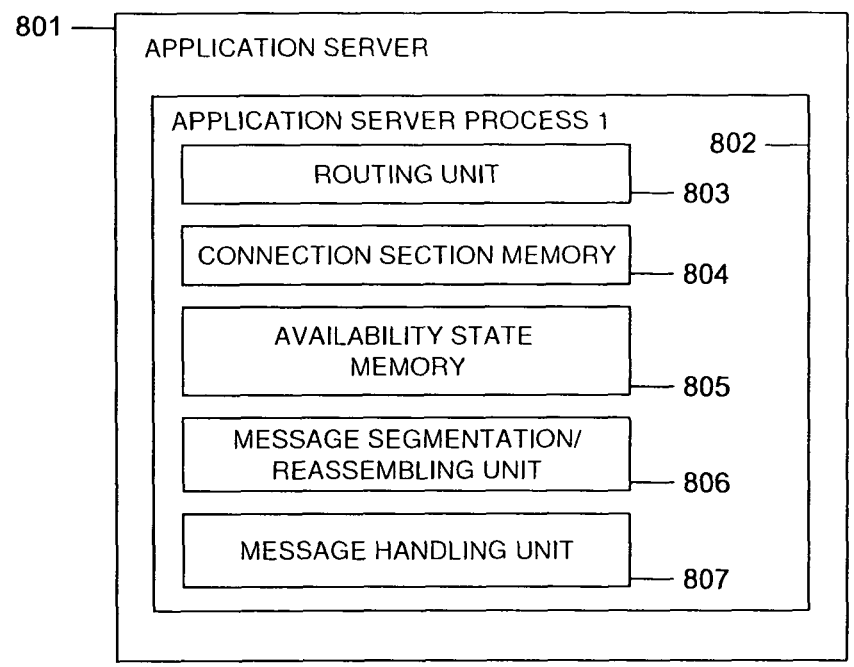
FIG. 8 is a schematic block diagram illustrating an application server according to an embodiment of the invention.

FIG. 8 schematically shows an embodiment of an application server 801. AS 801 comprises application server process 1 802, and may comprise further ASPs. ASP1 802 comprises a routing unit 803 configured to transmit messages to and receive messages from signaling gateways. ASP1 further comprises a connection section memory 804 for storing connection sections associated with connection oriented traffic. Availability state memory 805 stores the availability state of remote SS7 network destinations which may be reached by a particular signaling gateway. The availability state of an SS7 network node may be changed in accordance with signaling network management messages received e.g. from the signaling gateway via which the network node can be reached. Message segmentation/reassembling unit 806 is configured to reassemble incoming connection oriented messages and to segment outgoing connection oriented messages. They are for example segmented to a size such that the segmented messages may be transmitted via the SS7 network. Message handling unit 807 may transfer for example a received connection oriented data message to an application in accordance with an SSN stored in the associated connection section in memory 804.

Application server 801 may again be implemented as a host computer running a software implementation of application server process 802. It should be clear that signaling gateway 701 and application server 801 may also be implemented as distributed servers, where server processes serving the same server run on different host computers. ASPs 107 to 109 of FIG. 1 may for example run on different host computers.

Figure 9:
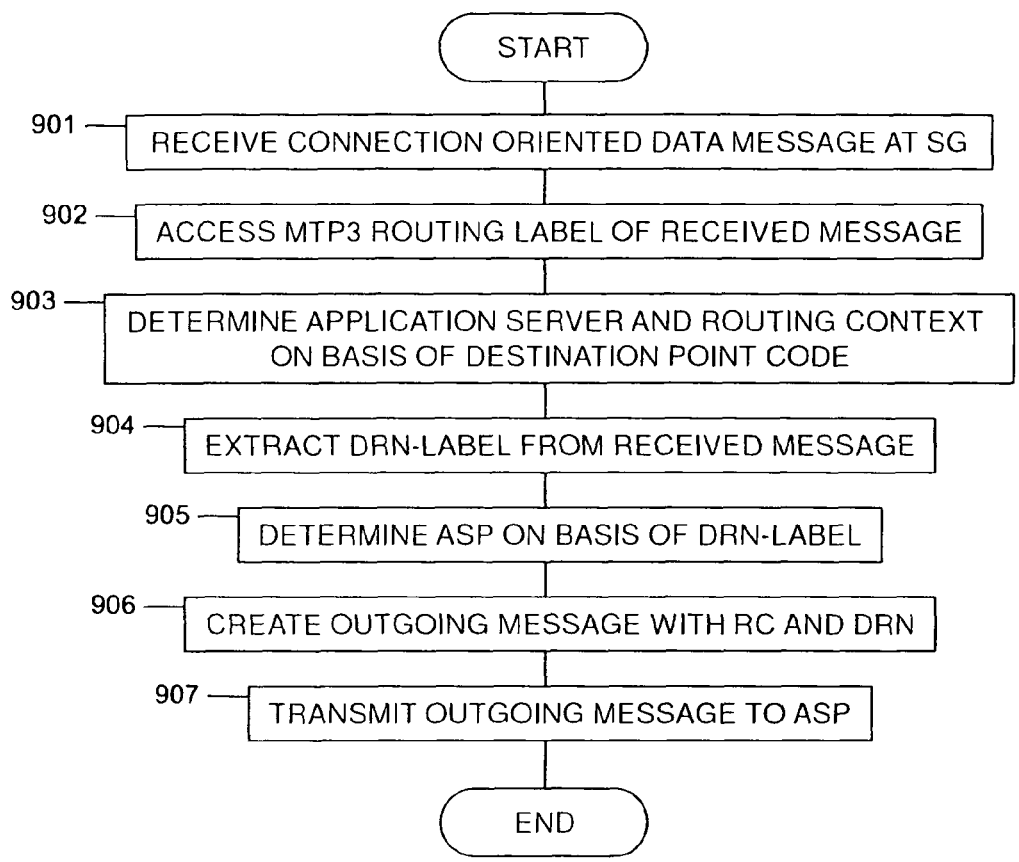
FIG. 9 is a flow diagram illustrating a method according to an embodiment of the invention.

FIG. 9 shows an embodiment of the method according to the invention. The method is performed at a signaling gateway, and comprises receiving a connection oriented data message in step 901. The MTP3 routing label of the message received from the SS7 network is accessed in step 902. On the basis of the DPC comprised in the routing label, an application server and routing context are determined in step 903, e.g. using a locally stored routing key. The received message comprises a DLR of which a DRN label is extracted in step 904. On the basis of the DRN label, an application server process is determined in step 905. The message is transcribed into an outgoing message comprising the RC and the DRN determined on the basis of the DLR. The message created in step 906 is then transmitted to the determined ASP in step 907. It should be clear that the method may comprise further steps such a routing of further CO data messages received from the SS7 network or the SUA network. The method may further comprise a routing of connection request and associated messages in both directions without establishing connection sections.

Figure 10:
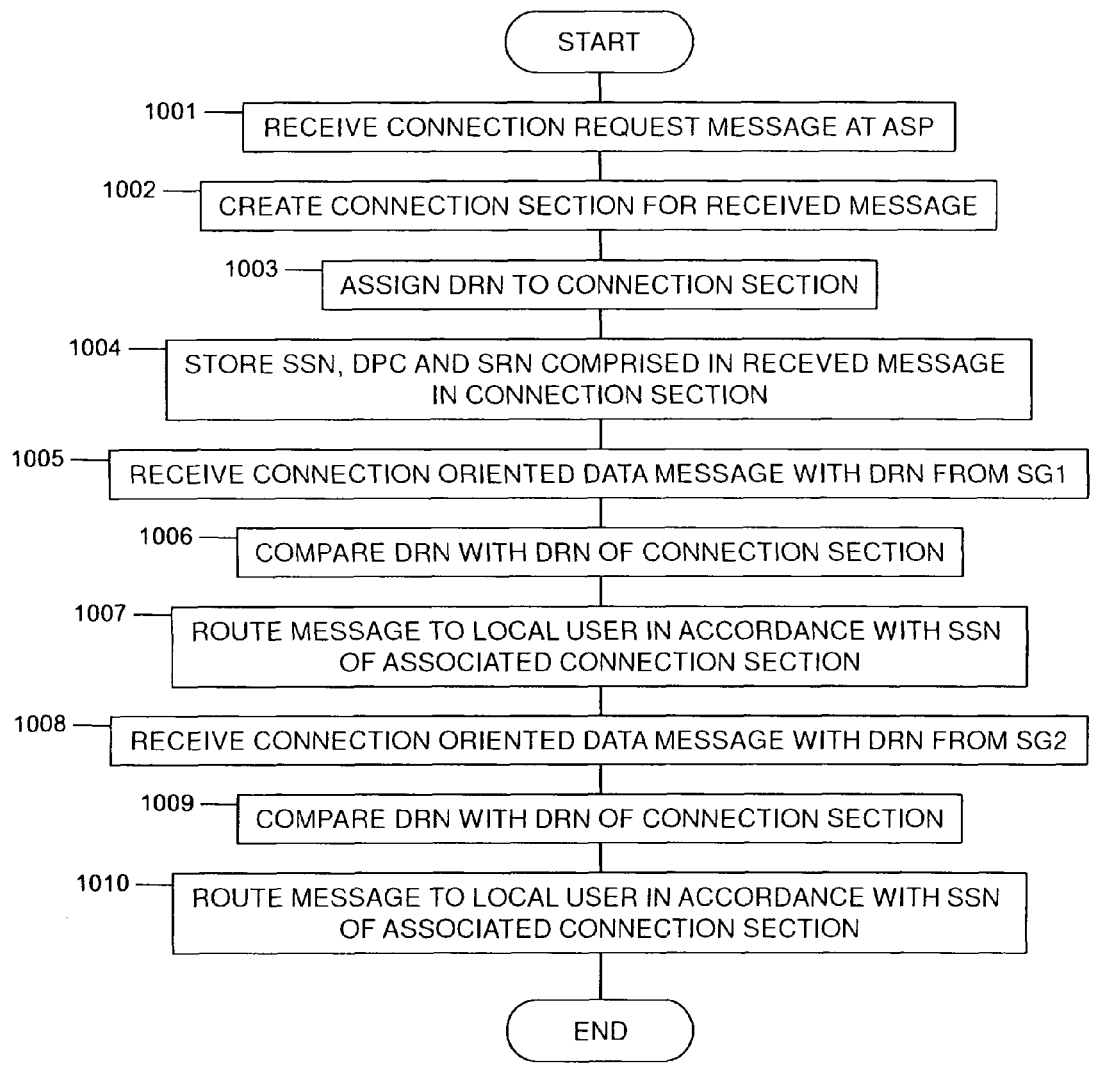
FIG. 10 is a flow diagram illustrating a method according to an embodiment of the invention.

FIG. 10 illustrates a method according to an embodiment of the invention performed at an ASP, wherein a connection request message is received in step 1001. In step 1002, the ASP creates a connection section for the received message and assigns a DRN in step 1003. In the connection section, an SSN, a DPC and an SRN comprised in the received message are stored in step 1004. A connection acknowledge message may now be sent to the SS7 node which originated the connection request message. After the connection between the SEP and the ASP is established, a connection oriented data message comprising a DRN is received via SG1 in step 1005. The DRN of the message is compared with the DRN of the connection section in step 1006 and the message is delivered to a local user in accordance with an SSN stored in the associated connection section in step 1007, if the DRNs match. In step 1008, another CO data message is received via SG2, and a DRN comprised in said message is again compared with the DRN of the connection section in step 1009. If they match, the message is again routed to a local user in accordance with the SSN stored in the associated connection section in step 1010. As can be seen, CO data messages may be received for the same connection section via different signaling gateways. It should be clear that the method of FIG. 10 may comprise further steps, such as reassembling data messages into a larger SUA message, the sending of a connection request message to establish a connection towards an SS7 SEP, and the like.

While specific embodiments of the invention are disclosed herein, various changes and modifications can be made without departing from the spirit and the scope of the invention. The present embodiments are to be considered in all respects as illustrative and non-restrictive, and all changed coming within the meaning and equivalency range of the appended claims are intended to be embraced therein.

The invention claimed is:

1. Method of operating a signalling gateway in a decoupled mode of operation for routing signalling messages between an SS7 network and an IP-based network, the method comprising:

in response to receiving from a first network node in one of the SS7 or the IP-based networks a connection request message requesting a connection with a second network node in a different one of the SS7 or the IP-based networks, transcribing the received message into a corresponding message and routing the transcribed message to the second network node without storing information at the signalling gateway coupling sections of the requested connection together; and in response to receiving a connection oriented data message from the SS7 network, performing a selection of an application server on the basis of a message transfer part 3 routing label comprised in the message and forwarding the message to an application server process of the application server in the IP-based network.

2. Method according to claim 1, wherein the application server process is selected by the signalling gateway on the basis of a destination local reference comprised in the received connection oriented data message and a routing key comprised in the signalling gateway.

3. Method according to claim 1, wherein the application server process is selected by the signalling gateway by:

extracting a destination reference number label from a destination local reference comprised in the data message received from the SS7 network;

comparing the extracted destination reference number label to a list of destination reference number labels associated with application server processes for the selected application server; and selecting the application server process for which the associated destination reference number label matches the extracted destination reference number label.

4. Method according to claim 1, further comprising:

in response to receiving a connection oriented message from the SS7 network, transcribing the message into a corresponding message conforming to a user adaptation protocol of the IP-based network and determining a destination reference number to be included in the transcribed message on the basis of a destination local reference comprised in the received message.

5. Method according to claim 1, further comprising:

in response to receiving a connection oriented message from the SS7 network, transcribing the message into a corresponding message conforming to a user adaptation protocol of the IP-based network and determining a source reference number to be included in the transcribed message on the basis of a source local reference comprised in the received message.

6. Method according to claim 1, further comprising:

in response to receiving a connection oriented message conforming to a user adaptation protocol from the IP-based network, transcribing the message into a corresponding message conforming to a signalling connection control part protocol of the SS7 network and determining a destination local reference to be included in the transcribed message on the basis of a destination reference number comprised in the received message.

7. Method according to claim 1, further comprising:

in response to receiving a connection oriented message conforming to a user adaptation protocol from the IP-based network, transcribing the message into a corresponding message conforming to a signalling connection control part protocol of the SS7 network and determining a source local reference to be included in the transcribed message on the basis of a source reference number comprised in the received message.

8. Method according to claim 1, further comprising:

in response to receiving a connection oriented data message from the SS7 network, transcribing the received message into a corresponding message comprising a routing context, the routing context being determined on the basis of the message transfer part 3 routing label and a routing key comprised in the signalling gateway, and transmitting the transcribed message to the application server process of the application server in the IP-based network.

9. Method according to claim 1, wherein, in response to receiving the connection request message, said transcribing and routing are performed without establishing a connection section towards one of the networks.

10. Method according to claim 1, further comprising:

in response to receiving a connection oriented data message from the IP-based network, transcribing the received message into a corresponding message comprising a message transfer part 3 routing label determined on the basis of a destination address comprised in the received message, and a network indicator determined on the basis of a routing context comprised in the received message, and transmitting the transcribed message to a network node of the SS7 network.

11. Method according to claim 10, wherein the transcribing further comprises including an originating point code in said message transfer part 3 routing label on the basis of an originating point code included in the connection oriented data message received from the IP-based network.

12. Method according to claim 10, wherein the transcribing further comprises including a signalling link selection in said message transfer part 3 routing label on the basis of a sequence control information element included in the connection oriented data message received from the IP-based network.

13. Method of processing a connection oriented signalling message at an application server process, the message being exchanged via a signalling gateway-between an SS7 network node and the application server process serving at least one application server in an IP-based network, the method comprising:
in response to receiving a connection request message via a signalling gateway, establishing a connection section comprising at least a network address of an SS7 network node received with said connection request message, and assigning a destination reference number to said connection section;
in response to receiving a connection oriented data message via a different signalling gateway, associating the received connection oriented data message with a connection section established by the application server process having a destination reference number corresponding to a destination reference number included in the received connection oriented data message.

14. Method according to claim 13, further comprising:
in response to receiving said connection request message, storing in said connection section at least one address related element comprised in the received message selected from a group comprising a sub system number, an originating point code, a destination point code, a signalling link selection, a called party address, a calling party address, a source reference number, and a routing context.

15. Method according to claim 13, further comprising:
reassembling connection oriented data messages received from the SS7 network associated with the same connection section into a user adaptation protocol data message, said connection oriented data messages being received via the same or via different signalling gateways.

16. Method according to claim 13, further comprising:
generating an outgoing connection oriented data message comprising at least a destination point code for addressing a network node in the SS7 network, said destination point code being determined from a destination point code stored in a connection section associated with the generated connection oriented data message and established in the application server process; and
sending said connection oriented data message to a signalling gateway towards which the application server process has an active association.

17. Method according to claim 16, wherein the generating of the connection oriented data message further comprises including a routing context in said message, the routing context being determined from a routing context stored in the associated connection section or being determined by the application server process on the basis of a routing key.

18. Method according to claim 16, further comprising:
sending plural outgoing connection oriented data messages towards the SS7 network, said messages being associated with the same connection section; and
distributing the outgoing connection oriented data messages between at least two signalling gateways towards which the application server process has active associations.

19. Method according to claim 16, wherein a loadsharing process is used for distributing outgoing connection oriented data messages associated with different connection sections between at least two signalling gateways, wherein the loadsharing process takes sequence control values associated with said outgoing connection oriented data messages into account.

20. Method according to claim 16, wherein the generating of the connection oriented data message further comprises including an originating point code in said message, the originating point code being determined from an originating point code stored in the associated connection section.

21. Method according to claim 16, further comprising segmenting the outgoing connection oriented data message and sending resulting segmented messages towards the same or different signalling gateways.

22. Method according to claim 16, wherein the signalling gateway and the application server each implement a protocol stack comprising a signalling connection control part SCCP user adaptation SUA protocol layer, and wherein connection oriented messages sent to or received from the IP-based network conform to said signalling connection control part SCCP user adaptation SUA protocol.

23. Signalling gateway for routing signalling messages between a SS7 network and an IP-based network, the signalling gateway comprising:
a routing circuit configured to:
in response to receiving from a first network node in one of the SS7 or the IP-based networks a connection request message requesting a connection with a second network node in a different one of the SS7 or the IP-based networks, transcribe the received message into a corresponding message and route the transcribed message to the second network node without storing information at the signalling gateway coupling sections of the requested connection together; and
route a connection oriented data message from the SS7 network to an application server process in the IP-based network by performing a selection of an application server on the basis of a message transfer part 3 (MTP3) routing label comprised in the message and forwarding the message to an application server process of the application server.

24. Signalling gateway according to claim 23, wherein the routing circuit is configured to select the application server process on the basis of a destination local reference comprised in the received connection oriented data message and a routing key comprised in the signalling gateway.

25. Signalling gateway according to claim 23, further comprising a list of destination reference number labels for an application server, wherein each destination reference number label is associated with an application server process of the application server, the routing circuit being further configured to perform the selecting of the application server process by extracting a destination reference number label from the destination local reference comprised in the data message received from the SS7 network and selecting an application server process from said list for which the associated destination reference number label matches the extracted destination reference number label.

26. Signalling gateway according to claim 23, further comprising a transcription circuit configured to transcribe a connection oriented data message received from the IP-based network into a corresponding SS7 message comprising
an message transfer part 3 routing label determined on the basis of a destination address comprised in the received message,
a network indicator determined on the basis of a routing context comprised in the received message, and
a destination local reference determined on the basis of a destination reference number comprised in the received message,
wherein the routing circuit is further configured to transmit the transcribed message to a network node of the SS7 network.

27. Signalling gateway according to claim 23, wherein the routing circuit is configured to route a connection request message from a network node of one of the SS7 or IP-based networks to a network node in the other network without establishing a connection section towards one of the networks.

28. Signalling gateway according to claim 23, wherein the routing circuit is configured to route a connection oriented data message without previously receiving an associated connection request message.

29. Application server comprising:
one or more processing circuits configured to implement at least one application server process for processing a signalling message;
wherein the application server process is configured to:
establish a connection section in response to receiving a connection request message from an SS7 network node via a signalling gateway and to receive connection oriented data messages for the same connection section via at least two different signalling gateways; and
associate a connection oriented data message received via any signalling gateway with the connection section on the basis of a destination reference number assigned to said connection section and a destination reference number comprised in the received message.

30. Application server according to claim 29, wherein the application server process is configured to establish a connection section towards a remote SS7 network node and to route connection oriented data messages associated with the same connection section towards said SS7 network node via different signalling gateways.

31. Application server according to claim 29, wherein the application server process is configured to store availability states of SS7 network nodes accessible via a signalling gateway towards which the application server process has a network association.

32. Application server according to claim 29, wherein the application server process is configured to create a connection oriented data message comprising a routing context and a destination point code, the destination point code being determined from a connection section established by the application server process and associated with the created connection oriented data message.

33. Application server according to claim 29, wherein the connection section stores at least one address related element selected from a group comprising a sub system number, an originating point code, a destination point code, a signalling link selection, a called party address, a calling party address, a source reference number, and a routing context, wherein the at least one address related element was received with the connection request message from the SS7 network node.

34. A computer program product stored on a non-transitory computer-readable medium and comprising electronically readable control information, wherein, when executed in a computer system, the control information operates a signalling gateway in a decoupled mode of operation for routing signalling messages between an SS7 network and an IP-based network by:
in response to receiving from a first network node in one of the SS7 or the IP-based networks a connection request message requesting a connection with a second network node in a different one of the SS7 or the IP-based networks, transcribing the received message into a corresponding message and routing the transcribed message to the second network node without storing information at the signalling gateway coupling sections of the requested connection together; and
in response to receiving a connection oriented data message from the SS7 network, performing a selection of an application server on the basis of a message transfer part 3 routing label comprised in the message and forwarding the message to an application server process of the application server in the IP-based network.

35. Method according to claim 1, wherein the signalling gateway and the application server each implement a protocol stack comprising a signalling connection control part SCCP user adaptation SUA protocol layer, and wherein connection oriented messages sent to or received from the IP-based network conform to said signalling connection control part SCCP user adaptation SUA protocol.

36. Method according to claim 2, further comprising identifying said routing key based on a destination point code included in said message transfer part 3 routing label.

* * * * *